J. W. BULLER.
AUTOMATIC COUPLING.
APPLICATION FILED AUG. 9, 1919.

1,333,384.

Patented Mar. 9, 1920.

WITNESSES
Frederick Diehl.
A. L. Kitchin

INVENTOR
J. W. Buller.
BY
ATTORNEYS

UNITED STATES PATENT OFFICE.

JACOB WIENS BULLER, OF HILLSBORO, KANSAS, ASSIGNOR TO THE BULLER COUPLER COMPANY, OF HILLSBORO, KANSAS, A CORPORATION.

AUTOMATIC COUPLING.

1,333,384.    Specification of Letters Patent.    Patented Mar. 9, 1920.

Application filed August 9, 1919. Serial No. 316,300.

*To all whom it may concern:*

Be it known that I, JACOB W. BULLER, a citizen of the United States, and a resident of Hillsboro, in the county of Marion and State of Kansas, have invented a new and useful Automatic Coupling, of which the following is a full, clear, and exact description.

This invention relates to couplers and particularly to automatic couplers for trucks and trailers, and has for an object to provide an improved simple and strong device which will automatically couple and which may be quickly and easily uncoupled manually.

Another object is to provide a coupler wherein two interlocking parts are presented, one of which is tapering so as to easily enter the other part during the coupling operation.

A further object of the invention is to provide a coupler which when coupled will not become accidentally uncoupled, though permitting instant uncoupling manually.

In the accompanying drawing:—

Figure 1:
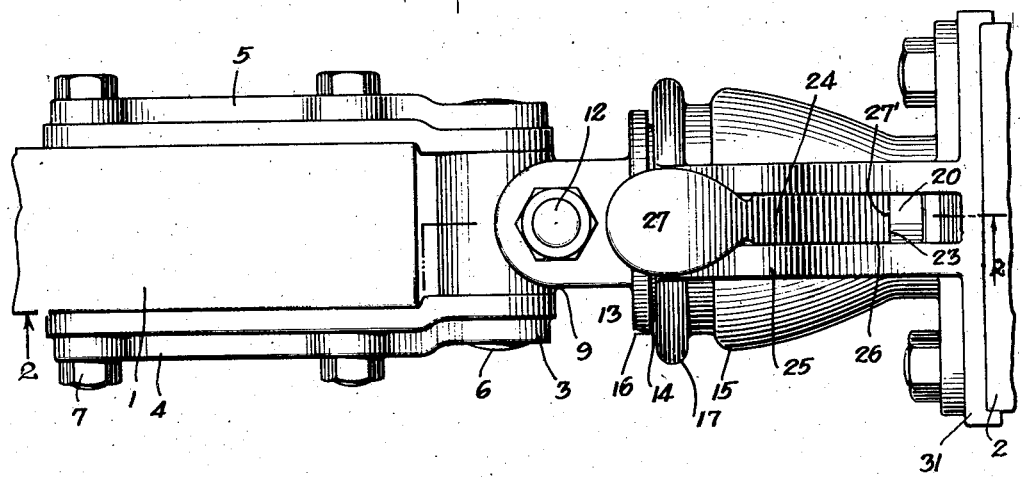
Figure 1 is a top plan view of a coupler disclosing an embodiment of the invention, the same being shown applied.
Figure 2:
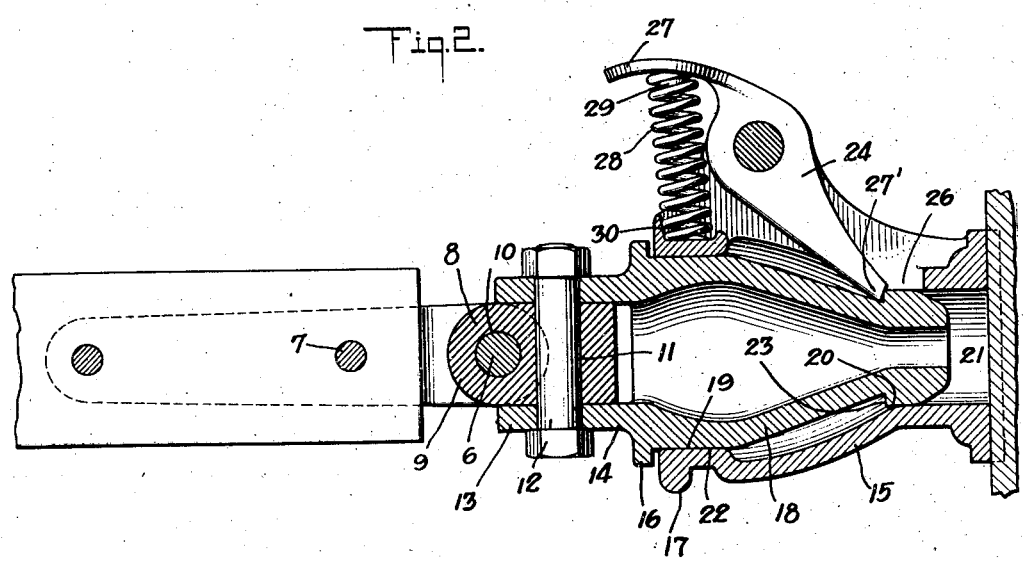
Fig. 2 is a longitudinal, vertical sectional view through Fig. 1 on line 2—2.

Referring to the accompanying drawing by numerals, 1 indicates the tongue of a trailer, or other article to be hauled while 2 indicates the truck which is doing the pulling. It will be understood that the coupler could be reversed if desired though the arrangement shown in the drawing is preferable. The yoke 3 is shown as bolted to a wood tongue, but these parts could be modified to fit any kind of a tongue, as for instance the ordinary round iron tongue now in common use. The yoke 3 is formed with side plates 4 and 5 and connected at one end with a horizontal journal pin 6, the side plates being clamped to the tongue by suitable bolts 7. The pin 6 forms part of a universal joint 8, which joint has a fitting or casing 9 provided with openings 10 and 11 extending at right angles to each other for receiving the respective pins 6 and 12. The pin 12 also extends through the bifurcated end 13 of the male part 14 of the coupler which is adapted to fit into the socket or female part 15 connected to the truck. The part or section 14 is provided with a buffer flange 16 adapted to strike against the buffer flange 17 on the socket 15 when the parts are being coupled. In this way the shock of coupling is taken off the weaker parts. The part 14 is formed with a tapering body 18 provided with annular bearing surfaces 19 and 20, surface 19 being comparatively large and positioned near the flange 16, while the surface 20 is comparatively small and positioned in a reduced bore 21 spaced an appreciable distance from surface 19. The socket 15 is formed with an annular bearing surface 22 for receiving the bearing surface 19 at the same time that the bore 21 receives the bearing surface 20. Adjacent the bearing surface 20 on part 14 is positioned a shoulder 23 against which the end of the locking pawl 24 rests when the coupler is in a coupled position. This pawl is pivotally mounted on a pair of ears 25 extending upwardly from the socket member 15 which socket member is slotted at 26 for permitting free movement of the pawl into and out of the socket. The outer end of the pawl is bent over and enlarged at 27 for providing a hand member whereby whenever it is desired to uncouple the coupler pressure is exerted on the enlargement 27 and the end 27' of the pawl 24 will be moved out of engagement with the shoulder 23 against the action of spring 28 which tends to hold the parts in the position shown in Fig. 2. This spring is retained in place by a projecting lug 29 on the enlargement 27 and by a spring socket 30 on the socket member 15. The front part of the socket member 15 is provided with a transverse section 31 adapted to be bolted or otherwise rigidly secured to the tractor. The universal connection 8 is very desirable as it permits the trailer tongue 1 and the truck 2 to swing up and down and also somewhat sidewise without injuring any part of the coupler.

What I claim is:

1. A coupler comprising a substantially funnel-shaped socket provided with an annular cylindrical bearing surface at the large end, an annular cylindrical bearing surface at the small end, a plunger provided with the same number of bearing surfaces as said socket, and of proper sizes to fit therein and co-act therewith for centering the plunger when the same is positioned in the socket, and a manually spring-pressed releasable lock for locking said plunger and said socket together, said plunger being formed with an annular shoulder against which said lock engages.

2. A coupler comprising a socket provided with two bearing surfaces of different sizes, both of said bearing surfaces being cylindrical and the larger bearing surface arranged adjacent the outer end of the socket member, a plunger provided with large and small bearing surfaces coacting with the large and small bearing surfaces of the socket and fitting therein, said plunger being provided with an annular shoulder adjacent the small bearing surface, a pivotally mounted pawl arranged on the socket member adapted to be moved into engagement with said shoulder at any point according to the position of the plunger, and means for normally holding the pawl in engagement with the shoulder.

JACOB WIENS BULLER.